US012172547B2

(12) United States Patent
Li et al.

(10) Patent No.: US 12,172,547 B2
(45) Date of Patent: Dec. 24, 2024

(54) SWITCHED-MODE POWER SUPPLY, ELECTRIC VEHICLE BATTERY SYSTEM, AND VEHICLE

(71) Applicant: CONTEMPORARY AMPEREX TECHNOLOGY (HONG KONG) LIMITED, Hong Kong (CN)

(72) Inventors: Weiqiang Li, Ningde (CN); Weijie Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 36 days.

(21) Appl. No.: 18/086,428

(22) Filed: Dec. 21, 2022

(65) Prior Publication Data

US 2023/0123807 A1  Apr. 20, 2023

Related U.S. Application Data

(63) Continuation of application No. PCT/CN2022/089619, filed on Apr. 27, 2022.

(30) Foreign Application Priority Data

Aug. 30, 2021 (CN) .......................... 202122067450.0

(51) Int. Cl.
*H02J 7/00* (2006.01)
*B60L 58/20* (2019.01)
(Continued)

(52) U.S. Cl.
CPC .............. *B60L 58/20* (2019.02); *H02J 7/342* (2020.01); *H02M 1/0003* (2021.05);
(Continued)

(58) Field of Classification Search
CPC ............. H02M 1/0003; H02M 1/0032; H02M 1/0045; H02M 1/007; H02M 3/156;
(Continued)

(56) References Cited

U.S. PATENT DOCUMENTS

2008/0284390 A1* 11/2008 Usui ................. H02M 3/33523
323/271
2010/0308772 A1* 12/2010 Walker .................... H02J 7/345
320/137
(Continued)

FOREIGN PATENT DOCUMENTS

CN  107244244 A   10/2017
CN  107933316 A   4/2018
(Continued)

OTHER PUBLICATIONS

The World Intellectual Property Organization (WIPO) International Search Report and written opinion for PCT/CN2022/089619 Jul. 11, 2022 11 pages (including English translation).
(Continued)

*Primary Examiner* — Zixuan Zhou
(74) *Attorney, Agent, or Firm* — ANOVA LAW GROUP, PLLC

(57) ABSTRACT

This application discloses a switched-mode power supply including a voltage isolation module, a voltage regulator module, a voltage converter circuit, a first switch, and an electric vehicle battery monitoring module; the voltage isolation module has an input connected to an electric vehicle battery and an output connected to an input terminal of the voltage regulator module. An output terminal of the voltage regulator module is connected to an input terminal of the voltage converter circuit, an output terminal of the voltage converter circuit is connected to one terminal of the first switch, and another terminal of the first switch is connected to the electric vehicle battery monitoring module;
(Continued)

and when the switched-mode power supply is in a low-power state, the first switch turns on and off intermittently according to a clock signal received, so that the electric vehicle battery monitoring module monitors the electric vehicle battery intermittently.

14 Claims, 4 Drawing Sheets

(51) Int. Cl.
   *H02J 7/34*     (2006.01)
   *H02M 1/00*     (2006.01)
   *H02M 3/156*    (2006.01)
   *H02M 3/158*    (2006.01)

(52) U.S. Cl.
   CPC ....... *H02M 1/0032* (2021.05); *H02M 1/0045* (2021.05); *H02M 1/007* (2021.05); *H02M 3/156* (2013.01); *H02M 3/158* (2013.01); *B60L 2210/10* (2013.01)

(58) Field of Classification Search
   CPC .... H02M 3/158; B60L 58/20; B60L 2210/10; H02J 7/342
   USPC .................................... 320/109, 137; 701/22
   See application file for complete search history.

(56) References Cited

U.S. PATENT DOCUMENTS

2013/0123807 A1    5/2013    Wells et al.
   2019/0077273 A1*   3/2019    Jang ................. B60L 58/20
   2023/0123807 A1    4/2023    Li et al.

FOREIGN PATENT DOCUMENTS

| | | |
   |---|---|---|
   | CN | 110641284 A | 1/2020 |
   | CN | 216122213 U | 3/2022 |
   | EP | 1431865 A2 | 6/2004 |
   | EP | 3798046 A1 | 3/2021 |
   | JP | 2003158822 A | 5/2003 |
   | JP | 2015095919 A | 5/2015 |
   | KR | 20110085714 A | 7/2011 |
   | KR | 20210083877 A | 7/2021 |
   | WO | 03094322 A1 | 11/2003 |

OTHER PUBLICATIONS

The European Patent Office (EPO) The Extended European Search Report for Application No. 22773377.1 Nov. 24, 2023 8 Pages.
The Japan Patent Office (JPO) Decision to Grant a Patent for Application No. 2022-560328 Dec. 26, 2023 6 Pages (including translation).
Korean Intellectual Property Office (KIPO) Request for the Submission of an Opinion for Application No. 10-2022-7033493 Jan. 10, 2024 6 Pages (including translation).
State Intellectual Property Office of China Notice of Grant of Invention Patent Right for Application No. 202122067450.0 Feb. 16, 2022 2 pages (including translation).
Korean Intellectual Property Office (KIPO) The Written Decision ON Registration For KR Application No. 10-2022-7033493 Sep. 25, 2024 7 Pages (Translation Included ).

* cited by examiner

SWITCHED-MODE POWER SUPPLY, ELECTRIC VEHICLE BATTERY SYSTEM, AND VEHICLE

CROSS-REFERENCE TO RELATED APPLICATIONS

This application is a continuation application of PCT Patent Application No. PCT/CN2022/089619, entitled "SWITCHED-MODE POWER SUPPLY, ELECTRIC VEHICLE BATTERY SYSTEM, AND VEHICLE" filed on Apr. 27, 2022, which claims priority to Chinese Patent Application No. 202122067450.0, filed with the State Intellectual Property Office of the People's Republic of China on Aug. 30, 2021, and entitled "SWITCHED-MODE POWER SUPPLY, ELECTRIC VEHICLE BATTERY SYSTEM, AND VEHICLE", all of which are incorporated herein by reference in their entirety.

TECHNICAL FIELD

Embodiments of this application relate to the field of switched-mode power supply technologies, and specifically, to a switched-mode power supply, an electric vehicle battery system, and a vehicle.

BACKGROUND

Electrical systems of electric vehicles all include a high-voltage electrical system and a low-voltage electrical system, where the high-voltage electrical system is often referred to as a high-voltage system and the low-voltage electrical system is referred to a low-voltage system. A switched-mode power supply converts a high voltage of an electric vehicle battery pack to a constant low voltage of 12V or 24V, which not only replenishes electricity for an auxiliary lead acid battery but also supplies power to a low-voltage system of a vehicle.

Conventional switched-mode power supplies are incapable of monitoring the electric vehicle battery pack around the clock, not working when the vehicle stops and is de-energized. This brings about potential safety hazards.

SUMMARY

In view of the foregoing problem, embodiments of this application provide a switched-mode power supply, an electric vehicle battery system, and a vehicle, to resolve the problem that a switched-mode power supply in the prior art is incapable of monitoring an electric vehicle battery around the clock.

According to one aspect of the embodiments of this application, a switched-mode power supply is provided, where the switched-mode power supply includes a voltage isolation module, a voltage regulator module, a voltage converter circuit, a first switch, and an electric vehicle battery monitoring module; an input side of the voltage isolation module is connected to an electric vehicle battery, an output side of the voltage isolation module is connected to an input terminal of the voltage regulator module, an output terminal of the voltage regulator module is connected to an input terminal of the voltage converter circuit, an output terminal of the voltage converter circuit is connected to one terminal of the first switch, and another terminal of the first switch is connected to the electric vehicle battery monitoring module; and when the switched-mode power supply is in a low-power state, the first switch turns on and off intermittently according to a clock signal received, so that the electric vehicle battery monitoring module monitors the electric vehicle battery intermittently.

In an exemplary manner, the switched-mode power supply further includes a clock module; an output terminal of the voltage converter circuit is connected to the clock module, and one terminal of the first switch is further connected to the clock module; and the clock module is configured to: when the switched-mode power supply is in the low-power state, control the first switch to turn on and off intermittently, so that the electric vehicle battery monitoring module monitors the electric vehicle battery intermittently.

In an exemplary manner, the switched-mode power supply further includes a control module, the control module is connected to the clock module and the first switch; the control module is configured to send a low power signal to the clock module upon reception of a low power trigger signal; and the clock module is further configured to: after receiving the low power signal, control the first switch to turn on and off intermittently so that the electric vehicle battery monitoring module monitors the electric vehicle battery intermittently.

In an exemplary manner, the first switch is further connected to an external clock trigger module, and the external clock trigger module is configured to: when the switched-mode power supply is in the low-power state, control the first switch to turn on and off intermittently, so that the electric vehicle battery monitoring module monitors the electric vehicle battery intermittently.

In an exemplary manner, the voltage isolation module includes a voltage divider resistor and an isolation switch. One terminal of the voltage divider resistor is connected to a positive electrode of the electric vehicle battery, the other terminal of the voltage divider resistor is connected to an input terminal of the isolation switch, an output terminal of the isolation switch is connected to the voltage regulator module, and a power input terminal of the isolation switch is connected to the output terminal of the voltage converter circuit.

In an exemplary manner, an output terminal of the voltage converter circuit is further connected to the power input terminal of the isolation switch and is configured to provide a first voltage to the isolation switch.

In an exemplary manner, the voltage converter circuit includes a first DC-to-DC converter and a second DC-to-DC converter; an input terminal of the first DC-to-DC converter is connected to the output terminal of the voltage regulator module, an output terminal of the first DC-to-DC converter is connected to one terminal of the first switch and an input terminal of the second DC-to-DC converter, and an output terminal of the second DC-to-DC converter is connected to the clock module.

In an exemplary manner, the switched-mode power supply further includes an external auxiliary wakeup module, and the external auxiliary wakeup module is configured to receive an external auxiliary wakeup signal and output a second voltage to an input terminal of the isolation switch.

In an exemplary manner, the external auxiliary wakeup module is further configured to receive an external auxiliary wakeup signal and output a second voltage to the electric vehicle battery monitoring module.

In an exemplary manner, the external auxiliary wakeup module includes a wakeup regulator circuit and a wakeup DC-to-DC converter module, where an output terminal of the wakeup regulator circuit is connected to an input terminal of the wakeup DC-to-DC converter module, and an output terminal of the wakeup DC-to-DC converter module is connected to the power input terminal of the isolation switch.

According to another aspect of the embodiments of this application, an electric vehicle battery system is provided, where the electric vehicle battery system includes the foregoing switched-mode power supply.

According to another aspect of the embodiments of this application, a vehicle is provided, where the vehicle includes a vehicle body and the foregoing electric vehicle battery system; and the electric vehicle battery system is disposed in the vehicle body.

The switched-mode power supply of the embodiments of this application includes the voltage isolation module, the voltage regulator module, the voltage converter circuit, the first switch, the an electric vehicle battery monitoring module, where the input side of the voltage isolation module is connected to the electric vehicle battery, the output side of the voltage isolation module is connected to the input terminal of the voltage regulator module, the output terminal of the voltage regulator module is connected to the input terminal of the voltage converter circuit, the output terminal of the voltage converter circuit is connected to one terminal of the first switch, and another terminal of the first switch is connected to the electric vehicle battery monitoring module. When the switched-mode power supply is in the low-power state, the first switch turns on and off intermittently according to a clock signal received, so that the electric vehicle battery monitoring module monitors the electric vehicle battery intermittently. This implements monitoring on the electric vehicle battery in the low-power state, and prevents excessive power consumption of the electric vehicle battery pack from affecting normal operation of the vehicle.

Further, in the embodiments of this application, the voltage divider resistor and the isolation switch in the voltage isolation module, and the external auxiliary wakeup signal are further provided. In this way, during assembling, dismantling, or maintenance of the switched-mode power supply in the electric vehicle battery system, it is ensured that voltages at two terminals of a high-voltage connector are less than given values after the high-voltage connector of the electric vehicle battery pack is disconnected, thereby ensuring safety in the operation process.

The foregoing description is merely an overview of the technical solutions in the embodiments of this application. In order to better understand the technical means in the embodiments of this application, to achieve implementation according to content of the specification, and to make the above and other objects, features and advantages in the embodiments of this application more obvious and easy to understand, the following describes specific embodiments of this application.

BRIEF DESCRIPTION OF DRAWINGS

Other advantages and benefits will become clearer and more comprehensible to a person of ordinary skill in the art by reading the following detailed description of preferred embodiments. Drawings are intended only to show preferred embodiments, and should not be deemed as limitations on this application. In all accompanying drawings, the same reference signs denote the same components. In the accompanying drawings.

DESCRIPTION OF EMBODIMENTS

Figure 1:
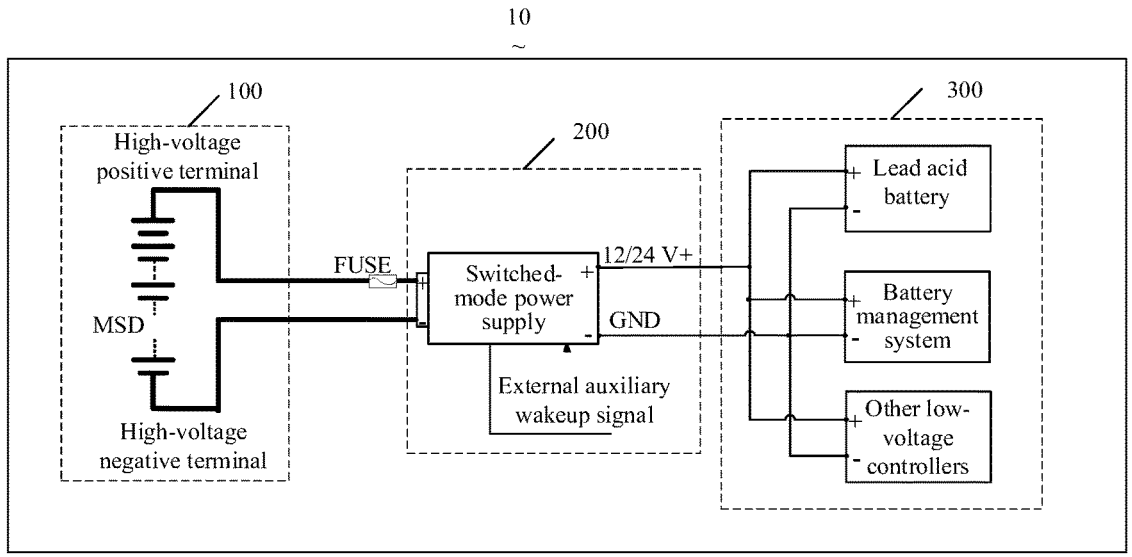
FIG. 1 is a schematic diagram of an application environment of a switched-mode power supply according to an embodiment of this application.

Exemplary embodiments of this application will be described in more detail below with reference to the accompanying drawings. Although exemplary embodiments of this application are illustrated in the accompanying drawings, it should be understood that this application can be implemented in various forms and should not be limited by embodiments set forth herein.

With rapid development of new energy vehicles, people attach increasing importance to safety of the new energy vehicles. The biggest difference between the new energy vehicles and conventional vehicles is that the new energy vehicles rely on high voltage and high current to provide power. Therefore, high voltage safety is a non-negligible problem in the design of the new energy vehicles. Electrical systems of electric vehicles all include a high-voltage electrical system and a low-voltage electrical system, where the high-voltage electrical system is often referred to as a high-voltage system and the low-voltage electrical system is referred to a low-voltage system. A switched-mode power supply converts a high voltage of an electric vehicle battery pack to a constant low voltage of 12V or 24V, which not only replenishes electricity for an auxiliary lead acid battery but also supplies power to a low-voltage system of a vehicle. The low-voltage system includes an air conditioner, lamps, a radio, power steering, driving controller, power windows, a battery management system, a defroster, a loudspeaker, a windshield wiper, and instruments. However, conventional switched-mode power supplies are incapable of monitoring the electric vehicle battery pack around the clock, not working when the vehicle stops and is de-energized. Therefore, it is not necessary to consider power consumption during sleep. In order to monitor the electric vehicle battery pack around the clock by the switched-mode power supply, the switched-mode power supply needs to be able to work when the vehicle stops and is de-energized. However, the inventor of this application found during implementation of the embodiments of this application that the switched-mode power supply is usually mounted inside the electric vehicle battery pack, and if the electric vehicle battery pack is to be monitored around the clock by the switched-mode power supply, the switched-mode power supply still needs to be in a normal operating state when the vehicle stops and is de-energized. This means that such switched-mode power supply keeps consuming electricity of the electric vehicle battery pack even if the vehicle stops and is de-energized. Power consumption by the switched-mode power supply in a sleeping state may lead to over-discharge of the electric vehicle battery pack, thereby affecting normal operation of the vehicle. Therefore, it needs to be considered how to make the switched-mode power supply enter a low-power sleeping state when the electric vehicle is de-energized, so as to reduce power consumption of the electric vehicle battery pack by the switched-mode power supply.

In addition, the switched-mode power supply serves as a common component of the new energy vehicle, and a high-voltage connector of the battery pack needs to be disconnected during maintenance and installation. In order to ensure safety of a user and avoid a risk of indirect electric shock, it needs to ensure that voltages at two terminals of the high-voltage connector are less than given values (generally, less than 36V) after the high-voltage connector is disconnected, so as to avoid injuries caused by electric shock due to high-voltage conduction to outside during dismantling and operation.

Therefore, in view of the technical problems described in the foregoing two aspects, in the embodiments of this application, improvements are made on the switched-mode power supply applied in a high-voltage component of a new energy vehicle, to implement monitoring on the electric vehicle battery around the clock by the switched-mode power supply. In addition, the switched-mode power supply can monitor the electric vehicle battery in the low-power mode, to prevent excessive power consumption of the electric vehicle battery pack from affecting normal operation of the vehicle. Moreover, the switched-mode power supply is usually mounted inside the electric vehicle battery pack, and therefore a high impedance is present on a high-voltage side during dismantling of the battery pack in after-sales service or installation, so as to keep operators safe.

First Aspect:

FIG. 1 is a schematic diagram of an application environment of a switched-mode power supply according to an embodiment of this application. In the schematic diagram of the application environment, the application environment of the switched-mode power supply is an electric vehicle battery system 10. As shown in FIG. 1, the electric vehicle battery system includes an electric vehicle battery 100, a switched-mode power supply 200, and a low-voltage function module 300. The electric vehicle battery 100 is configured to power a vehicle and the electric vehicle battery 100 further includes an MSD switch (a manual service disconnect). The MSD switch is configured to control on/off of a high voltage and a low voltage in the electric vehicle battery 100 during maintenance and installation. The switched-mode power supply 200 is configured to convert a high voltage provided by the electric vehicle power battery pack 100 to a low voltage. The low-voltage function module 300 is configured to receive a low-voltage power, and the low-voltage function module 300 includes a battery management system, lead acid battery, and other low-voltage controllers. The switched-mode power supply 200 receives a power input from the electric vehicle battery 100, and outputs a low voltage of 12/24 V to power the lead acid battery and other low-voltage components during operation. The switched-mode power supply 200 is further configured to monitor the electric vehicle battery 100, monitoring the electric vehicle battery 100 continuously in a normal state and monitoring the electric vehicle battery 100 intermittently in a low-power state. Monitoring the electric vehicle battery 100 in this embodiment of this application means monitoring a status of the electric vehicle battery 100, for example, power level, high-voltage state, low-voltage state, and temperature information.

The low-power state of the switched-mode power supply 200 in this embodiment is a state in which the switched-mode power supply has relatively low power consumption within a preset period of time. In the low-power state, the switched-mode power supply monitors the electric vehicle battery 100 intermittently.

In the electric vehicle battery system in this embodiment of this application, the electric vehicle battery is intermittently monitored when the switched-mode power supply is in the low-power state. This implements monitoring on the electric vehicle battery in the low-power state, and prevents excessive power consumption of the electric vehicle battery pack from affecting normal operation of the vehicle. A specific structure of the switched-mode power supply 200 is consistent with that in the following embodiment. Details are not described herein.

Figure 2:
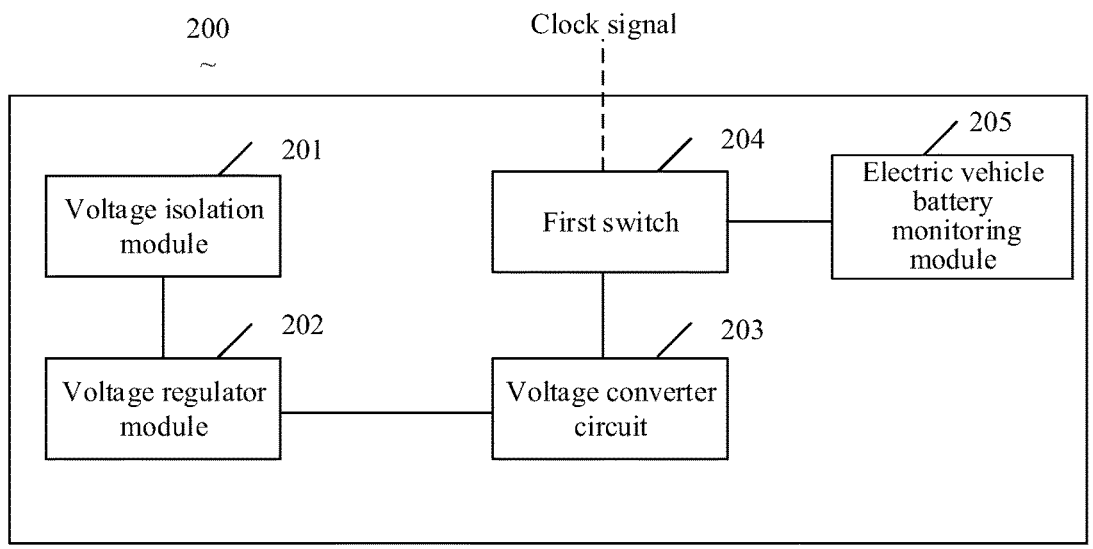
FIG. 2 is a structural schematic diagram of modules of a switched-mode power supply according to an embodiment of this application.

Second Aspect:

FIG. 2 is a structural schematic diagram of modules of a switched-mode power supply according to an embodiment of this application. As shown in FIG. 2, the switched-mode power supply 200 includes a voltage isolation module 201, a voltage regulator module 202, a voltage converter circuit 203, a first switch 204, and an electric vehicle battery monitoring module 205.

An input side of the voltage isolation module 201 is connected to a high-voltage positive terminal of an electric vehicle battery 100 in an electric vehicle battery system 10. An output side of the voltage isolation module 201 is connected to an input terminal of the voltage regulator module 202. An output terminal of the voltage regulator module 202 is connected to an input terminal of the voltage converter circuit 203. An output terminal of the voltage converter circuit 203 is connected to one terminal of the first switch 204, and another terminal of the first switch 204 is connected to the electric vehicle battery monitoring module 205. When the switched-mode power supply 200 is in a low-power state, the first switch 204 turns on and off intermittently according to a clock signal received, so that the electric vehicle battery monitoring module 205 monitors the electric vehicle battery 100 intermittently. The voltage isolation module 201, the voltage regulator module 202, the voltage converter circuit 203, the first switch 204, and the electric vehicle battery monitoring module 205 are further connected to a high-voltage negative terminal of the electric vehicle battery 100 in the electric vehicle battery system 10.

In this embodiment of this application, the voltage isolation module 201 is configured to isolate the high-voltage positive terminal from the high-voltage negative terminal of the electric vehicle battery 100 in an off state. The voltage regulator module 202 is configured to regulate a received voltage. The voltage converter circuit 203 is configured to convert a received high voltage to a low voltage. The first switch 204 is configured to: when the switched-mode power supply 200 is in a low-power state, turn on and off intermittently according to a clock signal received, so that the electric vehicle battery monitoring module 205 monitors the electric vehicle battery 100 intermittently. The first switch 204 is further connected to other low-voltage controllers and other function modules of the switched-mode power supply, and is configured to close when the switched-mode power supply is in a normal operating state, so as to output a low voltage to the electric vehicle battery 100, other low-voltage controllers, and other function modules of the switched-mode power supply. The clock signal received by the first switch 204 may be a clock signal generated inside the switched-mode power supply 200, or may be a clock signal sent from outside of the switched-mode power supply 200. The clock signal is a signal for controlling the first switch 204 to turn on and off. The switched-mode power supply 200 enters a low-power state upon receiving an external low power trigger signal. The low power trigger signal may be a signal generated according to a key turning action of an electric vehicle or a command signal sent by an electric vehicle through CAN communication. Specifically, the switched-mode power supply 200 further includes a control module. The control module obtains a key turning action of the electric vehicle or a command signal sent by the electric vehicle through CAN communication. After identifying the action or the signal, the control module controls the switched-mode power supply 200 to generate a clock signal from outside or inside, so as to make the switched-mode power supply 200 enter the low-power state.

The switched-mode power supply in this embodiment of this application includes the voltage isolation module 201, the voltage regulator module 202, the voltage converter circuit 203, the first switch 204, and the electric vehicle battery monitoring module 205. The input side of the voltage isolation module 201 is connected to the electric vehicle battery 100, the output side of the voltage isolation module 201 is connected to the input terminal of the voltage regulator module 202, the output terminal of the voltage regulator module 202 is connected to the input terminal of the voltage converter circuit 203, the output terminal of the voltage converter circuit 203 is connected to one terminal of the first switch 204, and another terminal of the first switch 204 is connected to the electric vehicle battery monitoring module 205. When the switched-mode power supply 200 is in the low-power state, the first switch 204 turns on and off intermittently according to the clock signal received, so that the electric vehicle battery monitoring module 205 monitors the electric vehicle battery intermittently. This implements monitoring on the electric vehicle battery 100 in the low-power state, and prevents excessive power consumption of the electric vehicle battery pack from affecting normal operation of the vehicle.

Figure 3:
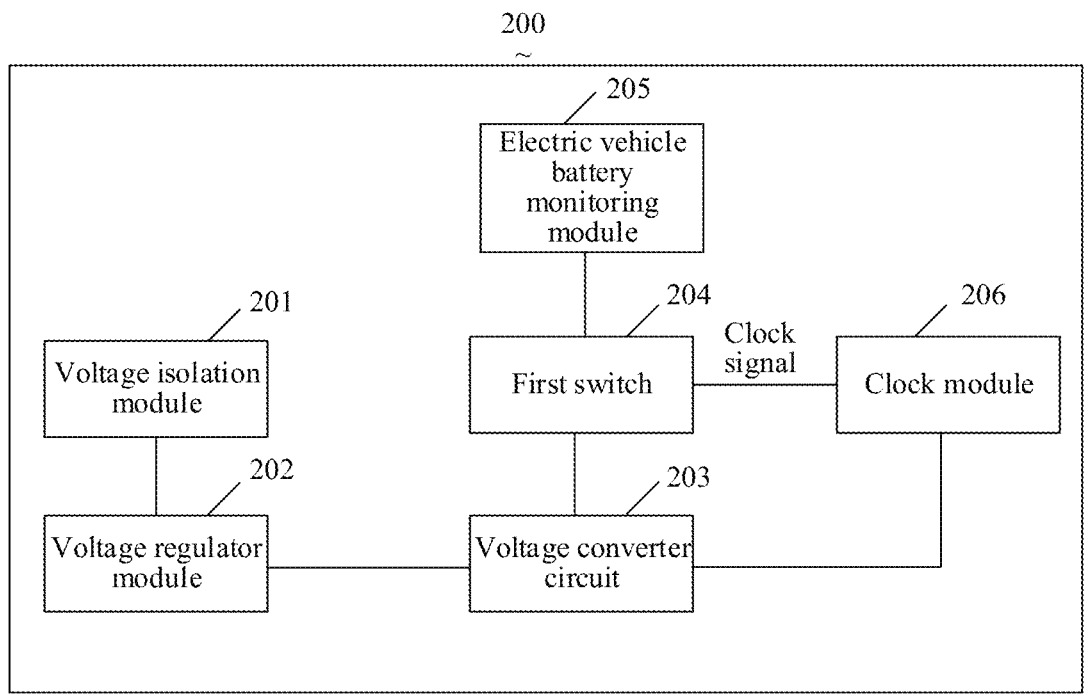
FIG. 3 is a schematic diagram of a circuit structure of a switched-mode power supply according to another embodiment of this application.

Third Aspect:

FIG. 3 is a schematic diagram of a circuit structure of a switched-mode power supply according to another embodiment of this application. A specific structure thereof is roughly the same as that in the foregoing second embodiment. Details are not described herein again. Referring to FIG. 2 and FIG. 3, a specific structure of a switched-mode power supply 200 in this embodiment is roughly the same as that in the foregoing second embodiment. Details are not described herein. A difference lies in that the switched-mode power supply 200 further includes a clock module 206. An output terminal of a voltage converter circuit 203 is connected to the clock module 206, and one terminal of a first switch 204 is further connected to the clock module 206. The clock module 206 is configured to: when the switched-mode power supply 200 is in a low-power state, control the first switch 204 to turn on and off intermittently so that the electric vehicle battery monitoring module 205 monitors the electric vehicle battery intermittently. The clock module 206 may generate, according to a preset command within a preset period of time, a clock signal for controlling the first switch 204, or a clock signal is generated by a control module. Specifically, in a case that the clock signal is generated by the control module, the clock module 206 is further connected to the control module of the switched-mode power supply 200. The control module obtains a key turning action of the electric vehicle or a command signal sent by the electric vehicle through CAN communication. After identifying the action or the signal, the control module sends a low power trigger signal to the clock module, so as to control the clock module to generate a clock signal according to the low power trigger signal. The first switch 204 receives the clock signal, and the clock signal enables the first switch to turn on and off intermittently, so that the switched-mode power supply 200 enters the low-power state. The electric vehicle battery monitoring module 205 monitors the electric vehicle battery when the first switch 204 is closed, and stops monitoring when the first switch 204 is open.

The clock module 206 inside the switched-mode power supply 200 is used to control the first switch 204 to turn on and off, so as to implement monitoring on the electric vehicle battery by the switched-mode power supply 200 in the low-power state. The internal clock module 206 consumes less electricity. In the low-power state, when the first switch 204 is open, only the clock module 206 consumes electricity and all other modules do not operate, and therefore power is supplied to only a necessary component (the clock module 206); when the first switch 204 is closed, monitoring is performed in an intermittent manner, and therefore the switched-mode power supply consumes less electricity. Further, as controlling is performed by the clock module 206 inside the switched-mode power supply, functions of an existing clock module can be used directly, featuring simple design of a circuit structure and high portability.

Figure 4:
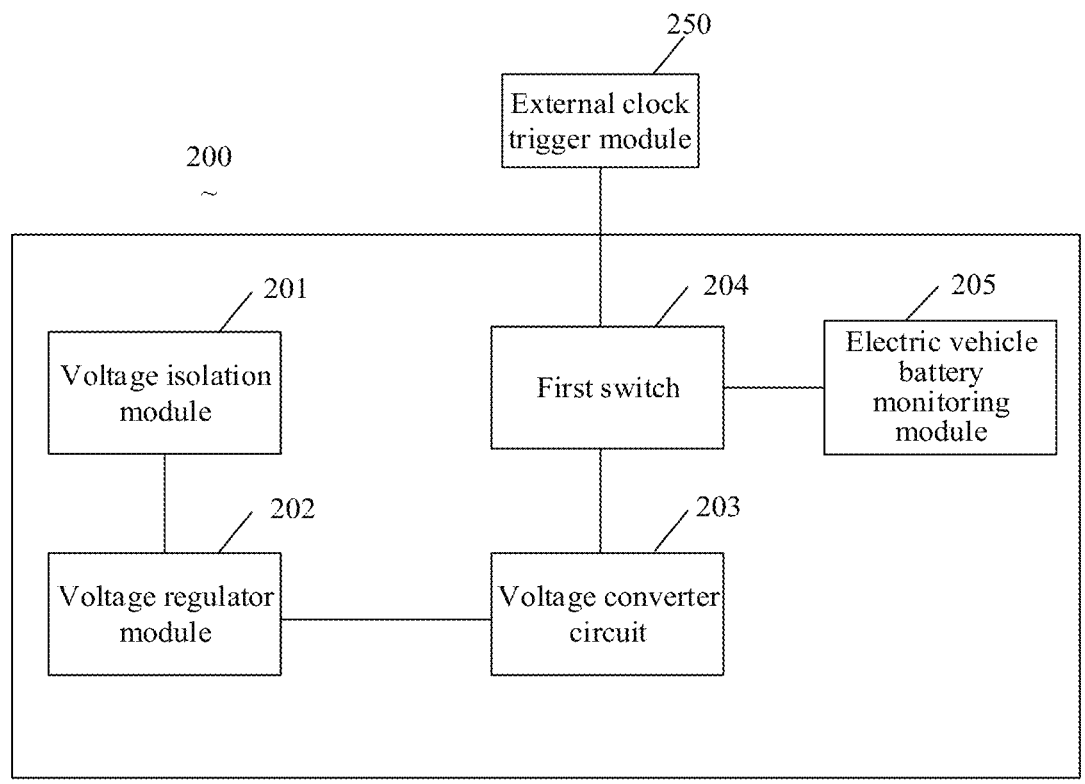
FIG. 4 is a schematic diagram of a circuit structure of a switched-mode power supply according to yet another embodiment of this application.

Fourth Aspect:

FIG. 4 is a schematic diagram of a circuit structure of a switched-mode power supply according to still another embodiment of this application. A specific structure thereof is roughly the same as that in a second embodiment and the third embodiment. Details are not described herein again. Referring to FIG. 3 and FIG. 4, a difference from the third embodiment lies in that a first switch 204 in a switched-mode power supply 200 in this embodiment is connected to an external clock trigger module 250. The external clock trigger module 250 initiates a clock signal to control the first switch 204 to turn on and off intermittently, so as to cause the switched-mode power supply 200 to enter a low-power state. An electric vehicle battery monitoring module 205 monitors an electric vehicle battery when the first switch 204 is closed, and stops monitoring when the first switch 204 is open. The external clock trigger module 250 needs to undergo voltage regulation and voltage conversion before being connected to the first switch 204. The external clock trigger module 250 is a module independent of the switched-mode power supply.

The external clock trigger module 250 outside the switched-mode power supply 200 controls the first switch 204 to turn on and off, so as to implement monitoring on the electric vehicle battery by the switched-mode power supply 200 in the low-power state. The external clock trigger module 250 is independent of the switched-mode power supply and can use external power separately, with no need to consume electricity of the electric vehicle battery. Further, provision of the external clock trigger module 250 facilitates easy control of switching between the low-power state and a normal operating state of the switched-mode power supply.

Fifth Aspect:

A switched-mode power supply in this embodiment has a circuit structure roughly the same as that in the foregoing embodiments. Details are not described herein again. In this embodiment, a voltage isolation module includes a voltage divider resistor and an isolation switch. One terminal of the voltage divider resistor is connected to a positive electrode (high-voltage positive terminal) of an electric vehicle battery, the other terminal of the voltage divider resistor is connected to an input terminal of the isolation switch, an output terminal of the isolation switch is connected to a voltage regulator module, and a power input terminal of the isolation switch is connected to an output terminal of a voltage converter circuit. The output terminal of the voltage converter circuit is further connected to the power input terminal of the isolation switch and is configured to provide a first voltage to the isolation switch. When an electric vehicle battery system is in manual operations of maintenance, installation, dismantling, and the like, a MSD switch of the electric vehicle battery is disconnected. However, in manual operations, if the MSD switch fails or short circuits occur during operation, and the like, a positive electrode and a negative electrode of the electric vehicle battery may come in contact, posing hazards. In this embodiment, the voltage divider resistor and the isolation switch are provided. After the MSD switch is disconnected, the positive electrode and negative electrode of the electric vehicle battery are both disconnected, so that no voltage is output from the voltage converter circuit and no voltage is input to the power input terminal of the isolation switch, to make the isolation switch off. The isolation switch and the voltage divider resistor generate a high impedance, and a high impedance is kept on a high-voltage side all the time during maintenance of the electric vehicle battery system, thereby ensuring safety of operators.

In this embodiment, the switched-mode power supply further includes an external auxiliary wakeup module. The external auxiliary wakeup module is configured to receive an external auxiliary wakeup signal and output a second voltage to the input terminal of the isolation switch. With such provision, after a manual operation such as maintenance, installation, or dismantling is completed, the second voltage is generated by triggering an external auxiliary wakeup signal to provide a power input for the isolation switch and make the isolation switch work. When the MSD switch is closed, the electric vehicle battery is conductively connected to the MSD switch and the switched-mode power supply, so that the electric vehicle battery system works again.

Figure 5:
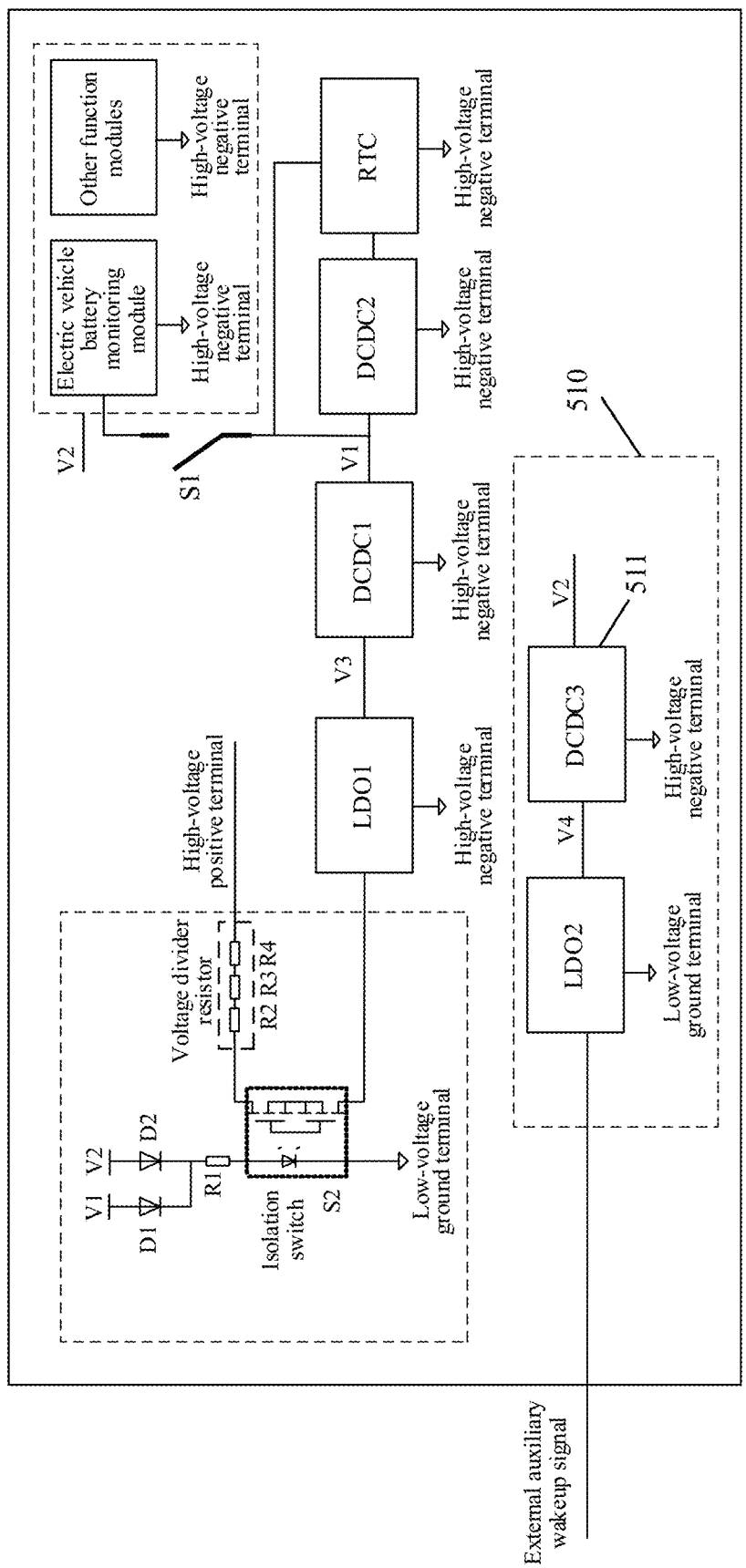
FIG. 5 is a schematic diagram of a circuit structure of a switched-mode power supply according to still another embodiment of this application.

Sixth Aspect:

FIG. 5 is a schematic diagram of a circuit structure of a switched-mode power supply according to still another embodiment of this application. Referring to FIG. 3 and FIG. 5, in this embodiment, the switched-mode power supply includes a voltage isolation module, a voltage regulator module, a voltage converter circuit, a first switch, an electric vehicle battery monitoring module, a clock module, and an external auxiliary wakeup module 510. The voltage isolation module 201 includes an isolation switch S2 and a voltage divider resistor. The voltage divider resistor includes a first voltage divider resistor R2, a second voltage divider resistor R3, and a third voltage divider resistor R4. The voltage regulator module includes a first low dropout regulator LDO1 (Low Dropout Regulator, low dropout regulator). The voltage converter circuit includes a first DC-to-DC converter DCDC1 and a second DC-to-DC converter DCDC2. The clock module includes an RTC (real-time clock, real-time clock). The external auxiliary wakeup module 510 includes an external auxiliary wakeup signal, a second low dropout regulator LD02, and a third DC-to-DC converter DCDC3 511. The third DC-to-DC converter DCDC3 511 is an example of the wakeup DC-to-DC converter module.

Specifically, a power input terminal of the isolation switch S2 is connected to an output terminal of the first DC-to-DC converter DCDC1 and an output terminal of the third DC-to-DC converter DCDC3 511 via anti-reverse diodes D1 and D2. A first voltage V1 output by the first DC-to-DC converter DCDC1 and a second voltage V2 output by the third DC-to-DC converter DCDC3 511 both supply power for the isolation switch S2. A load terminal of the isolation switch S2 is connected to the voltage divider resistor. An output terminal of the isolation switch S2 is connected to an input terminal of the first low dropout regulator LDO1. An output terminal of the first low dropout regulator LDO1 is connected to an input terminal of the first DC-to-DC converter DCDC1. The output terminal of the first DC-to-DC converter DCDC1 outputs the first voltage V1 to provide the first voltage V1 for a first switch S1, the isolation switch S2, the electric vehicle battery monitoring module, and other function modules; and is connected to an input terminal of the second DC-to-DC converter DCDC2. An output terminal of the second DC-to-DC converter DCDC2 is connected to the RTC and is configured to supply power to the RTC. An input terminal of the second low dropout regulator LD02 of the external auxiliary wakeup module 510 is connected to the external auxiliary wakeup signal, and an output terminal is connected to an input terminal of the third DC-to-DC converter DCDC3 511. The output terminal of the third DC-to-DC converter DCDC3 511 outputs the second voltage V2 to provide the second voltage V2 for the isolation switch S2, the electric vehicle battery monitoring module, and other function modules. The RTC is further connected to the first switch S1, and the first switch S1 is connected to the electric vehicle battery monitoring module and other function modules.

When an electric vehicle battery system is in an operating state and the electric vehicle is still energized, the switched-mode power supply is in a normal operating state in this case. The switched-mode power supply is connected to a high-voltage positive terminal of the electric vehicle battery through the voltage divider resistor, and a high voltage is transmitted to the first low dropout regulator LD01 through the isolation switch S2. The first low dropout regulator LD01 outputs a high voltage V3 that is regulated, and the first DC-to-DC converter DCDC1 outputs the first voltage V1 being a low voltage. The first voltage V1 being a low voltage supplies power to the electric vehicle battery monitoring module and other function modules of the switched-mode power supply through the first switch S1. The first voltage V1 further supplies power to low-voltage function modules of the electric vehicle battery system, and the first voltage V1 supplies power to the isolation switch S2. When the electric vehicle battery system is in an operating state and the electric vehicle is de-energized (for example, a key turning action), a low power trigger signal is triggered to be generated, a control module of the switched-mode power supply receives and sends the low power trigger signal to the RTC. After receiving the low power trigger signal, the RTC generates a clock signal, and controls the first switch S1 to turn on and off intermittently according to the clock signal, so that the electric vehicle battery monitoring module monitors the electric vehicle battery intermittently. When the electric vehicle battery system is in an operating state, the RTC may alternatively generate a clock signal automatically according to a low power trigger signal that is preset, so as to control the first switch S1 to turn on and off. For example, the clock signal may enable the first switch S1 to operate for several microseconds, turn off for several minutes, operate for another several microseconds, and then turn off for another several minutes. In this way, less electricity of the electric vehicle battery is consumed by the switched-mode power supply being in a low-power state, and the electric vehicle battery is monitored around the clock.

When the electric vehicle battery system requires maintenance, installation, or dismantling, after an MSD switch is disconnected, continuity between a positive electrode and a negative electrode of the electric vehicle battery is broken, so that there is no output from the first DC-to-DC converter DCDC1 of the switched-mode power supply. In this case, the external auxiliary wakeup signal does not provide the second voltage V2, and the power input terminal of the isolation switch S2 can receive neither the first voltage V1 nor the second voltage V2. Therefore, the isolation switch is off, and the impedance of the electric vehicle battery from a high-voltage positive terminal to a high-voltage negative terminal be a voltage divider resistor (R2, R3, and R4), a disconnection impedance at a load terminal of the isolation switch S2, and a ground impedance of the first low dropout regulator LD01. When an operator measures a high-voltage loop voltage at a disconnection location of the MSD switch, a voltage at the disconnection location of the MSD switch can be controlled low enough by configuring impedance of the voltage divider resistors (R2, R3, and R4) to reach a safe operation voltage, so as to keep operators safe. After the maintenance, installation, or dismantling is completed, the electric vehicle battery system needs to resume operation. In this case, the MSD switch is closed and an external auxiliary wakeup signal is triggered, so that the output terminal of the third DC-to-DC converter DCDC3 outputs the second voltage V2 to supply power to the isolation switch S2. In this way, the isolation switch S2 operates and establishes continuity, to resume operation of the electric vehicle battery system. In addition, when the electric vehicle battery system does not work, the first switch S1 and the external auxiliary wakeup module neither works. Therefore, the external auxiliary wakeup signal further provides the second voltage V2 to the electric vehicle battery monitoring module and other function modules to control operation of the first switch S1 and the RTC, so as to enter the low-power state.

The switched-mode power supply in this embodiment of this application includes the voltage isolation module, the voltage regulator module, the voltage converter circuit, the first switch, the an electric vehicle battery monitoring module, where the input side of the voltage isolation module is connected to the electric vehicle battery, the output side of the voltage isolation module is connected to the input terminal of the voltage regulator module, the output terminal of the voltage regulator module is connected to the input terminal of the voltage converter circuit, the output terminal of the voltage converter circuit is connected to one terminal of the first switch, and another terminal of the first switch is connected to the electric vehicle battery monitoring module. When the switched-mode power supply is in the low-power state, the first switch turns on and off intermittently according to a clock signal received, so that the electric vehicle battery monitoring module monitors the electric vehicle battery intermittently. This implements monitoring on the electric vehicle battery in the low-power state, and prevents excessive power consumption of the electric vehicle battery pack from affecting normal operation of the vehicle.

Further, in this embodiment of this application, the voltage divider resistor and the isolation switch in the voltage isolation module, and the external auxiliary wakeup signal are further provided. In this way, during assembling, dismantling, or maintenance of the switched-mode power supply in the electric vehicle battery system, it is ensured that voltages at two terminals of a high-voltage connector are less than given values after the high-voltage connector of the electric vehicle battery pack is disconnected, thereby ensuring safety in the operation process.

Seventh Aspect:

This embodiment provides an electric vehicle battery system that is essentially the same as the electric vehicle battery system in the first embodiment. Details are not described herein again. A switched-mode power supply in the electric vehicle battery system in this embodiment has a specific structure roughly the same as that in the foregoing embodiments. Details are not described herein again.

Figure 6:
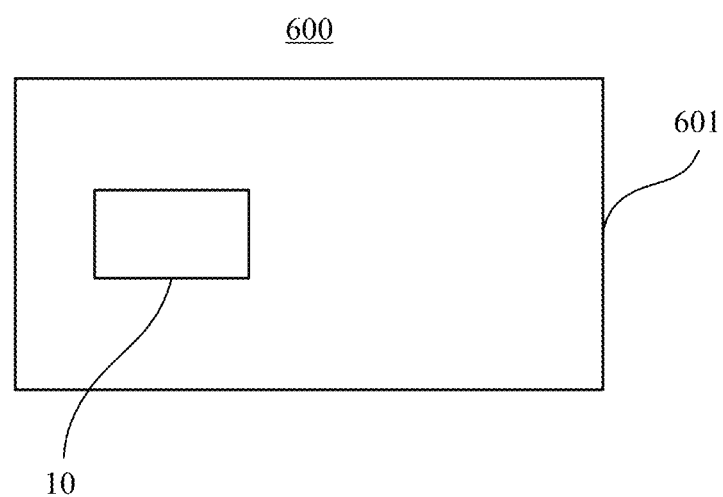
FIG. 6 is a schematic diagram of a vehicle according to an embodiment of this application.

Eighth Aspect:

This embodiment provides a vehicle 600 that includes a vehicle body 601 and the electric vehicle battery system 10 in the foregoing embodiments, as shown in FIG. 6. The electric vehicle battery system 10 is disposed on the vehicle body 601.

A lot of specific details are described in this specification provided herein. However, it can be understood that the embodiments of this application can be implemented without such specific details. In some embodiments, in order not to obscure understanding of this specification, well-known switched-mode power supplies, structures, and technologies are not shown in detail.

Similarly, it should be understood that, to simplify this application and help understand one or more of the application aspects, in the foregoing descriptions of exemplary embodiments of this application, features of the embodiments of this application are sometimes combined in one embodiment, diagram, or descriptions thereof. However, the switched-mode power supply of this disclosure should not be construed as reflecting an intention that the claimed application requires more features than those expressly recorded in each claim.

Those skilled in the art can understand that modules of a device in the embodiments can be adaptively changed and arranged in one or more devices different from those in the embodiments. Modules, units, or assemblies in the embodiments may be combined into one module, unit, or assembly, or may be divided into a plurality of sub-modules, sub-units, or sub-assemblies. Except that at least some of such features and/or processes or units are mutually exclusive, all features disclosed in this specification (including accompanying claims, summary, and accompanying drawings) and all processes or units of any switched-mode power supply or device so disclosed may be combined in any manner. Each feature disclosed in this specification (including the accompanying claims, abstract and drawings) may be replaced by alternative features serving the same, equivalent, or similar purpose, unless expressly stated otherwise.

It should be noted that above embodiments are intended to describe this application but not intended to constitute any limitation on this application. Persons skilled in the art may design alternative embodiments without departing from the scope of the appended claims. In the claims, any reference signs in brackets should not constitute any limitation on the claims. The word "comprise" does not exclude presence of elements or steps not listed in the claims. The word "a" or "an" preceding an element does not preclude presence of a plurality of such elements. This application may be implemented with the help of hardware including a number of different components and with the help of an appropriately programmed computer. In the unit claims enumerating several apparatuses, several of these apparatuses may be implemented by same hardware. The words "first", "second", "third", and the like do not imply any order. These words can be interpreted as names. Unless otherwise specified, the steps in the foregoing embodiments should not be construed as a limitation on an execution order.

What is claimed is:

1. A switched-mode power supply, comprising a voltage isolation module, a voltage regulator module, a voltage converter circuit, a first switch, and an electric vehicle battery monitoring module; wherein:
   an input of the voltage isolation module is connected to an electric vehicle battery, an output of the voltage isolation module is connected to an input terminal of the voltage regulator module, an output terminal of the voltage regulator module is connected to an input terminal of the voltage converter circuit, an output terminal of the voltage converter circuit is connected to one terminal of the first switch, and another terminal of the first switch is connected to the electric vehicle battery monitoring module; and
   in response to the switched-mode power supply entering a low-power state in which the switched-mode power supply has relatively low but non-zero power consumption within a preset period of time, the first switch turns on and off intermittently according to a clock signal received, so that the electric vehicle battery monitoring module monitors the electric vehicle battery intermittently;
   wherein the electric vehicle battery monitoring module monitors the electric vehicle battery when the first switch turns on and stops monitoring the electric vehicle battery when the first switch turns off.

2. The switched-mode power supply according to claim 1, further comprising a clock module, wherein
   an output terminal of the voltage converter circuit is connected to the clock module, and one terminal of the first switch is further connected to the clock module; and
   the clock module is configured to: when the switched-mode power supply is in a low-power state, control the first switch to turn on and off intermittently so that the electric vehicle battery monitoring module monitors the electric vehicle battery intermittently.

3. The switched-mode power supply according to claim 2, further comprising a control module, wherein the control module is connected to the clock module and the first switch;
   the control module is configured to send a low power signal to the clock module upon reception of a low power trigger signal; and
   the clock module is further configured to: after receiving the low power signal, control the first switch to turn on and off intermittently so that the electric vehicle battery monitoring module monitors the electric vehicle battery intermittently.

4. The switched-mode power supply according to claim 1, wherein the first switch is further connected to an external clock trigger module, wherein
   the external clock trigger module is configured to: when the switched-mode power supply is in a low-power state, control the first switch to turn on and off intermittently so that the electric vehicle battery monitoring module monitors the electric vehicle battery intermittently.

5. The switched-mode power supply according to claim 1, wherein the voltage isolation module comprises a voltage divider resistor and an isolation switch (S2), wherein
   one terminal of the voltage divider resistor is connected to a positive electrode of the electric vehicle battery, the other terminal of the voltage divider resistor is connected to an input terminal of the isolation switch (S2), an output terminal of the isolation switch (S2) is connected to the voltage regulator module, and a power input terminal of the isolation switch (S2) is connected to the output terminal of the voltage converter circuit.

6. The switched-mode power supply according to claim 5, wherein the output terminal of the voltage converter circuit is further connected to the power input terminal of the isolation switch (S2) and is configured to provide a first voltage to the isolation switch (S2).

7. The switched-mode power supply according to claim 2, wherein the voltage converter circuit comprises a first DC-to-DC converter and a second DC-to-DC converter, wherein
   an input terminal of the first DC-to-DC converter is connected to the output terminal of the voltage regulator module, an output terminal of the first DC-to-DC converter is connected to one terminal of the first switch and an input terminal of the second DC-to-DC converter, and an output terminal of the second DC-to-DC converter is connected to the clock module.

8. The switched-mode power supply according to claim 6, further comprising an external auxiliary wakeup module, wherein
   the external auxiliary wakeup module is configured to receive an external auxiliary wakeup signal and output a second voltage to the input terminal of the isolation switch (S2).

9. The switched-mode power supply according to claim 8, wherein the external auxiliary wakeup module is further configured to receive an external auxiliary wakeup signal and output a second voltage to the electric vehicle battery monitoring module.

10. The switched-mode power supply according to claim 8, wherein the external auxiliary wakeup module comprises a wakeup regulator circuit and a wakeup DC-to-DC converter module, wherein an output terminal of the wakeup regulator circuit is connected to an input terminal of the wakeup DC-to-DC converter module, and an output terminal of the wakeup DC-to-DC converter module is connected to the power input terminal of the isolation switch (S2).

11. An electric vehicle battery system, comprising the switched-mode power supply according to claim 1.

12. A vehicle, comprising:
   a vehicle body and the electric vehicle battery system according to claim 11,
   wherein the electric vehicle battery system is disposed in the vehicle body.

13. A switched-mode power supply, comprising a voltage isolation module, a voltage regulator module, a voltage converter circuit, a first switch, and an electric vehicle battery monitoring module; wherein:
   an input of the voltage isolation module is connected to an electric vehicle battery, an output of the voltage isolation module is connected to an input terminal of the voltage regulator module, an output terminal of the voltage regulator module is connected to an input terminal of the voltage converter circuit, an output terminal of the voltage converter circuit is connected to one terminal of the first switch, and another terminal of the first switch is connected to the electric vehicle battery monitoring module;
   when the switched-mode power supply is in a low-power state, the first switch turns on and off intermittently according to a clock signal received, so that the electric vehicle battery monitoring module monitors the electric vehicle battery intermittently; and
   the voltage isolation module comprises a voltage divider resistor and an isolation switch, wherein an output terminal of the voltage converter circuit is connected to a power input terminal of the isolation switch and is configured to provide a first voltage to the isolation switch.

14. A switched-mode power supply, comprising a voltage isolation module, a voltage regulator module, a voltage converter circuit, a first switch, an electric vehicle battery monitoring module, and a clock module; wherein:

an input of the voltage isolation module is connected to an electric vehicle battery, an output of the voltage isolation module is connected to an input terminal of the voltage regulator module, an output terminal of the voltage regulator module is connected to an input terminal of the voltage converter circuit, an output terminal of the voltage converter circuit is connected to one terminal of the first switch, and another terminal of the first switch is connected to the electric vehicle battery monitoring module;

the voltage converter circuit comprises a first DC-to-DC converter and a second DC-to-DC converter, wherein:

an input terminal of the first DC-to-DC converter is connected to the output terminal of the voltage regulator module, an output terminal of the first DC-to-DC converter is connected to one terminal of the first switch and an input terminal of the second DC-to-DC converter, and an output terminal of the second DC-to-DC converter is connected to the clock module; and when the switched-mode power supply is in a low-power state, the first switch turns on and off intermittently according to a clock signal received, so that the electric vehicle battery monitoring module monitors the electric vehicle battery intermittently.

* * * * *